United States Patent
Oh

(10) Patent No.: US 7,776,466 B2
(45) Date of Patent: *Aug. 17, 2010

(54) STRUCTURE OF LAYERING UNIT CELLS FOR HIGH POWER LITHIUM POLYMER BATTERY

(75) Inventor: Jeon-keun Oh, Daejeon (KR)

(73) Assignee: SK Energy Co., Ltd., Seoul (KR)

( * ) Notice: Subject to any disclaimer, the term of this patent is extended or adjusted under 35 U.S.C. 154(b) by 66 days.

This patent is subject to a terminal disclaimer.

(21) Appl. No.: 11/908,581

(22) PCT Filed: Mar. 22, 2006

(86) PCT No.: PCT/KR2006/001040

§ 371 (c)(1),
(2), (4) Date: Sep. 13, 2007

(87) PCT Pub. No.: WO2006/101343

PCT Pub. Date: Sep. 28, 2006

(65) Prior Publication Data

US 2008/0160400 A1    Jul. 3, 2008

(30) Foreign Application Priority Data

Mar. 23, 2005    (KR) .................... 10-2005-0024173

(51) Int. Cl.
H01M 6/46    (2006.01)
H01M 6/42    (2006.01)

(52) U.S. Cl. .................. 429/153; 429/151; 429/152

(58) Field of Classification Search .............. 429/153, 429/162
See application file for complete search history.

(56) References Cited

U.S. PATENT DOCUMENTS

| 6,255,015 B1 | 7/2001 | Corrigan et al. |
| 2003/0215702 A1* | 11/2003 | Tanjou et al. ............... 429/127 |
| 2004/0038124 A1* | 2/2004 | Hisamitsu et al. ........... 429/161 |
| 2004/0119442 A1 | 6/2004 | Lee et al. |
| 2004/0234848 A1 | 11/2004 | Chung et al. |
| 2007/0072066 A1* | 3/2007 | Yoon et al. .................... 429/99 |

FOREIGN PATENT DOCUMENTS

KR    10-2005-0000594    6/2005

* cited by examiner

*Primary Examiner*—Melvin C Mayes
*Assistant Examiner*—Michael Forrest
(74) *Attorney, Agent, or Firm*—McDermott Will & Emery LLP

(57) ABSTRACT

Disclosed herein is a structure of layering unit cells for a lithium polymer battery, in which electrode terminals are provided on surfaces of the respective unit cells for the lithium polymer battery, and are alternately layered, thus allowing the unit cells to be connected in series through only a layering operation without an additional connecting device. The battery system includes first and second unit cells each having a pouch and anode and cathode terminals which are connected to a surface of the pouch and are oppositely bent in upward and downward directions. In this case, the cathode terminal of the second unit cell is directly connected to the anode terminal of the first unit cell.

5 Claims, 4 Drawing Sheets

[Fig. 1]
(Prior Art)
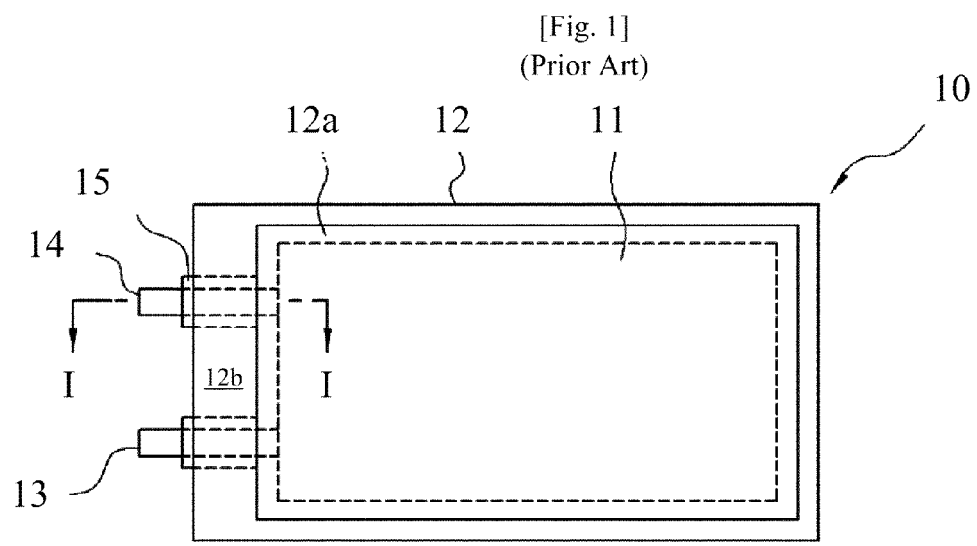
[Fig. 2]
(Prior Art)
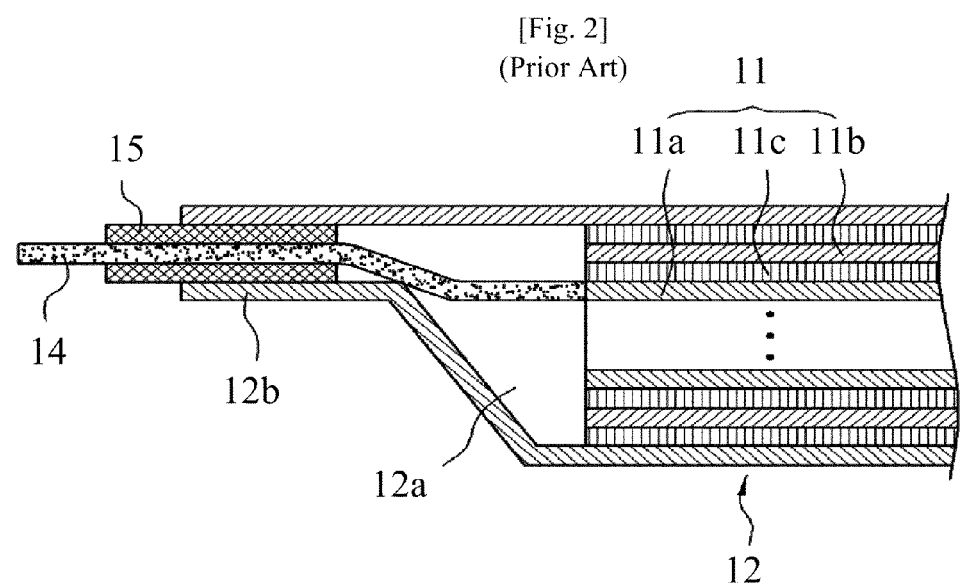

[Fig. 3]
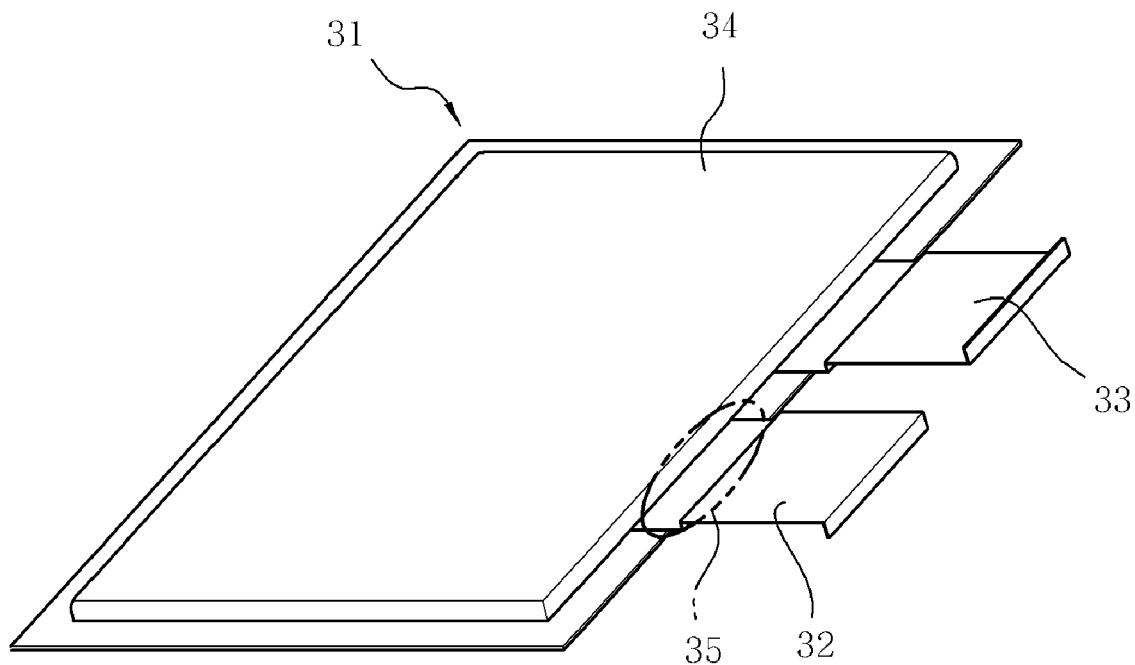
[Fig. 4]
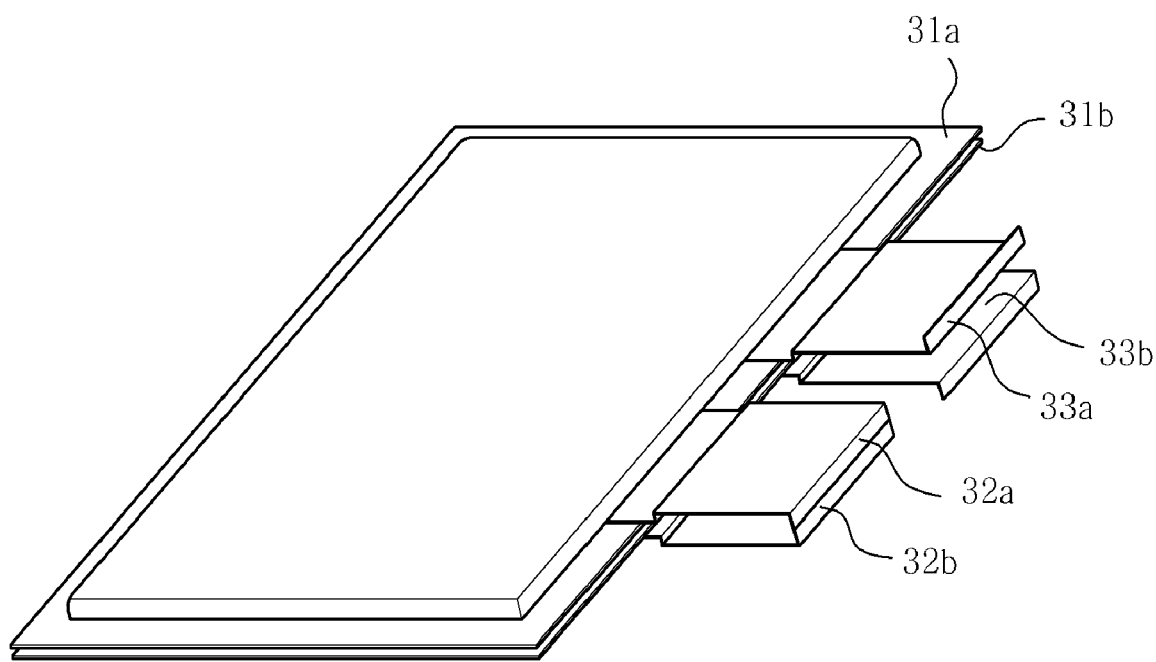

[Fig. 5]
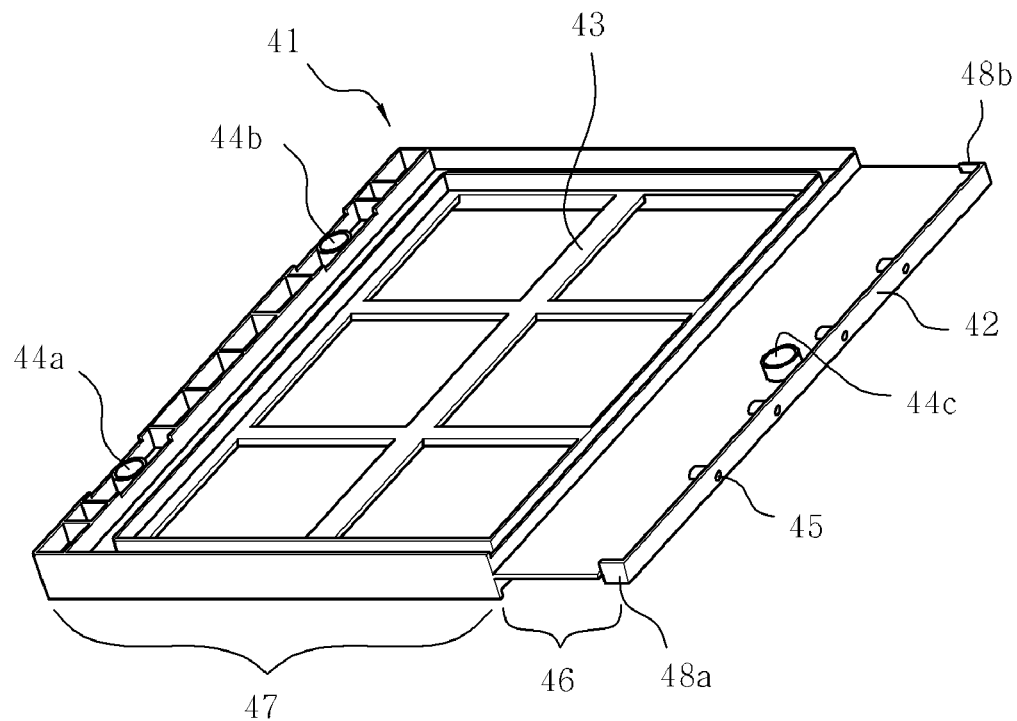
[Fig. 6]
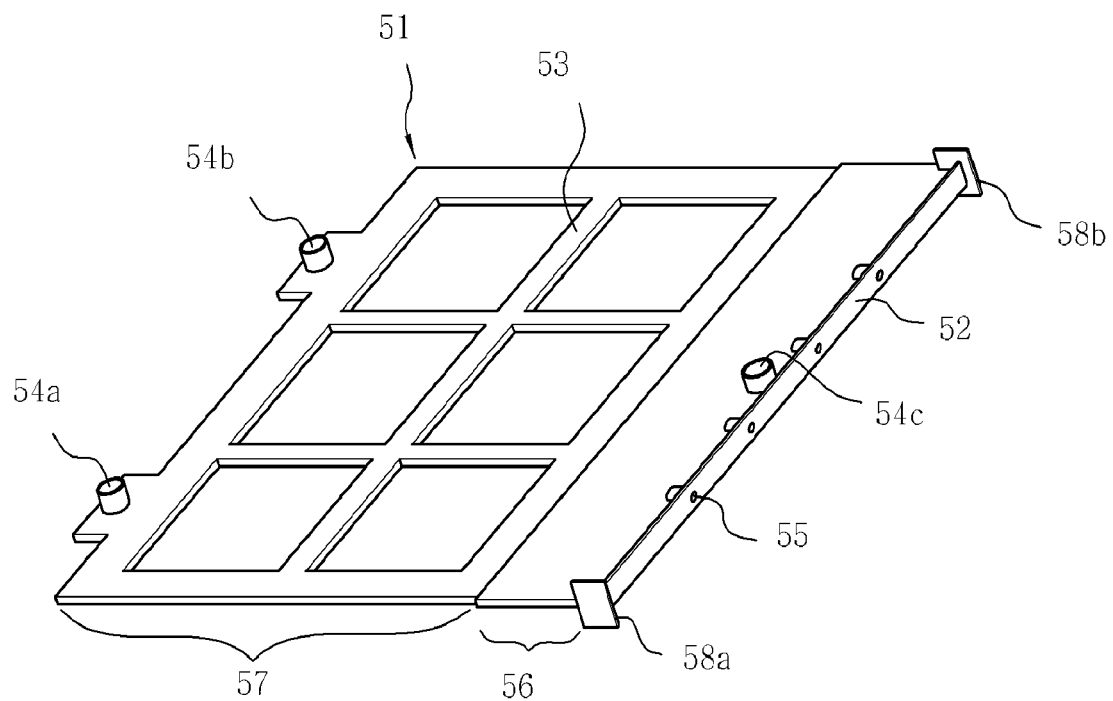

[Fig. 7]
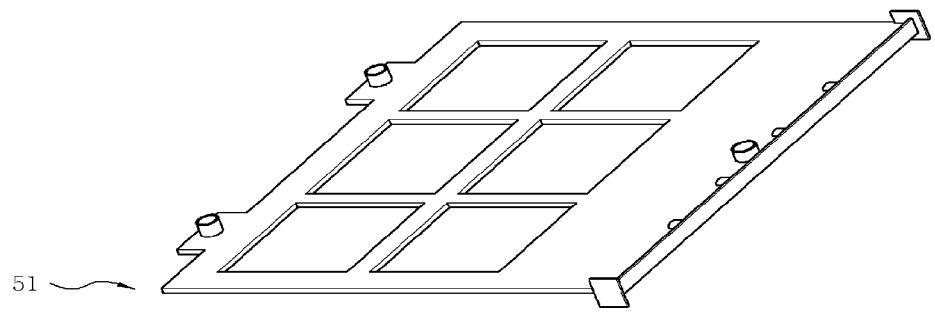
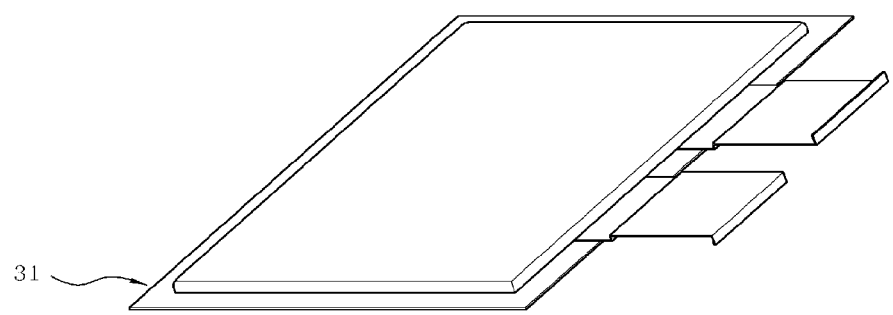
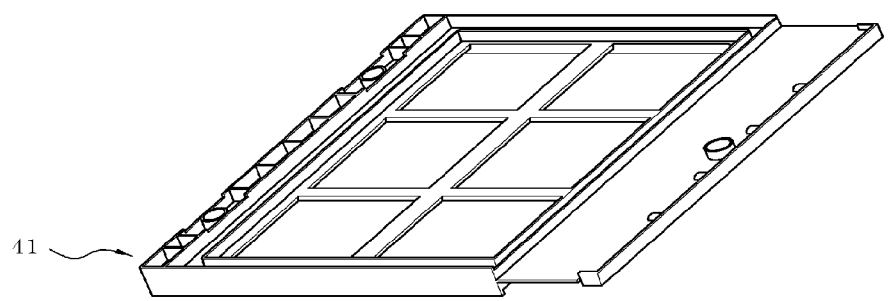
[Fig. 8]
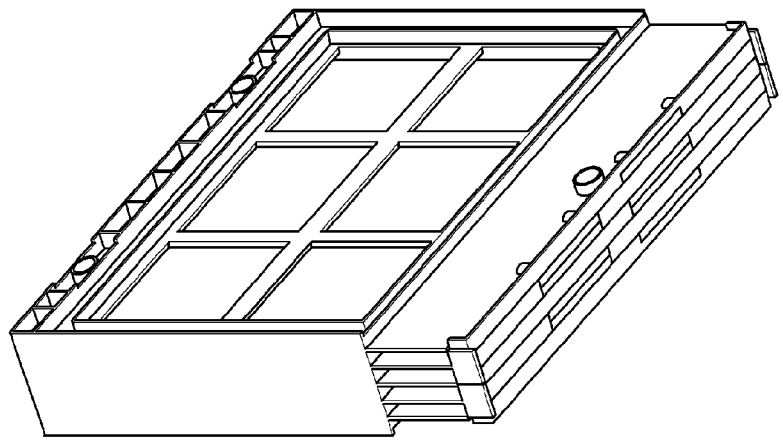

STRUCTURE OF LAYERING UNIT CELLS FOR HIGH POWER LITHIUM POLYMER BATTERY

CROSS-REFERENCE TO PRIOR APPLICATION

This is a U.S. National Phase Application under 35 U.S.C. §371 of International Patent Application No. PCT/KR2006/001040 filed Mar. 22, 2006, which claims the benefit of Korean Patent Application No. 10-2005-0024173 filed Mar. 23, 2005, which is incorporated by reference herein in its entirety. International Patent Application No. PCT/KR2006/001040 was published in English on Sep. 28, 2006 as WO 2006/101343 A1 under PCT Article 21(2).

TECHNICAL FIELD

The present invention relates to a structure of layering unit cells for a high power lithium polymer battery.

More particularly, the present invention relates to a structure of layering unit cells for a lithium polymer battery, in which electrode terminals are provided on surfaces of the respective unit cells for the lithium polymer battery, and are alternately layered, thus allowing the unit cells to be connected in series through only a layering operation without an additional connecting device.

BACKGROUND ART

Generally, a secondary battery can be recharged and discharged, unlike a primary battery. Researches on the secondary battery have been conducted to adapt the secondary battery to a high-technology field, such as digital cameras, cellular phones, notebook computers, or hybrid cars. As examples of secondary batteries, there are a nickel-cadmium battery, a nickel-metal hydride battery, a nickel-hydrogen battery, a rechargeable lithium battery, and others. Among them, the rechargeable lithium battery has an operating voltage of 3.6V or higher, and is used as a power source for portable electronic equipment. Further, several rechargeable lithium batteries are connected in series for use in a hybrid car. The operating voltage of the rechargeable lithium battery is 3 times as high as the nickel-cadmium battery or the nickel-metal hydride battery. Further, the rechargeable lithium battery has high energy density per unit weight. For these reasons, the use of rechargeable lithium batteries has increased rapidly.

The rechargeable lithium battery may be fabricated in various shapes, for example, a cylindrical shape or a prismatic shape, which is used for a lithium-ion battery. A lithium polymer battery which has received much attention recently is manufactured in a flexible pouch shape, so that its shape may be variously changed. Further, the lithium polymer battery is excellent in stability and light in weight, so that it is advantageous to achieve the slim and lightweight portable electronic equipment.

Referring to FIG. 1, a conventional pouch-type rechargeable lithium battery 10 includes a battery part 11 and a case 12. The case 12 provides a space 12a for accommodating the battery part 11 therein.

The battery part 11 is made by arranging an anode plate, a separator, and a cathode plate sequentially and winding them in one direction, or by layering a plurality of anode plates, separators, and cathode plates. Each electrode plate of the battery part 11 is electrically connected to an anode or cathode terminal 13 or 14.

One end of each of the anode and cathode terminals 13 and 14 protrudes out of a sealing surface 12b of the case 12. The protruding ends of the anode and cathode terminals 13 and 14 are connected to terminals of a protective circuit board, which is not shown in the drawings.

A sealing tape 15 is wound around a junction of the outer surface of each of the anode and cathode terminals 13 and 14 and the sealing surface 12b so as to prevent a short-circuit between the case 12 and the electrode terminals 13 and 14.

The case 12 does not have a cylindrical or prismatic can-like structure made of a thick gold material, but has a pouched structure which has a metal foil in a middle layer and inner and outer layers attached to opposite surfaces of the metal foil and made of an insulating film. Instead, the pouched case has excellent malleability, so that it may be bent as desired. As described above, the case 12 has the space 12a for accommodating the battery part 11 therein, and the sealing surface 12b is provided on a surface which is thermally fused along the edge of the space 12a.

FIG. 2 is an enlarged view taken along line I-I of FIG. 1.

Referring to the drawing, the case 12 comprises a composite film having a middle layer 12c and inner and outer layers 12d and 12e. The middle layer 12c is made of metal foil, for example, aluminum foil. The inner and outer layers 12d and 12e comprise insulating films which are attached to inner and outer surfaces of the middle layer 12c to protect the middle layer 12c.

The battery part 11, having the anode plate 11a, the separator 11c, and the cathode plate 11b sequentially arranged, is housed in the space 12a defined in the case 12. The anode terminal 13 and the cathode terminal 14 extend from the anode plate 11a and the cathode plate 11b, as shown in FIG. 1. Ends of the electrode terminals 13 and 14 are exposed to the outside through the sealing surface 12b of the case 12. The sealing tape 15 surrounds the outer surface of each of the electrode terminals 13 and 14 in the sealing surface 12b.

The battery part 11 of the pouch-type rechargeable lithium battery 10 constructed as described above is obtained through the following process. First, the anode and cathode terminals 13 and 14 are electrically connected to the anode and cathode plates 11a and 11b. Next, the anode plate 11a, the separator 11c, and the cathode plate 11b are sequentially arranged. In such a state, they are wound in one direction, so that the battery part 11 is completed.

The completed battery part 11 is mounted in the case 12 having the space 12a through a drawing process. During a mounting operation, one end of each of the electrode terminals 13 and 14 is exposed to the outside of the case 12. In such a state, predetermined heat and pressure are applied to the sealing surface 12b of the case 12, so that thermal fusion is executed. Thereby, the pouch-type rechargeable lithium battery 10 is completed. The completed pouch-type rechargeable lithium battery 10 goes through a series of formation processes, including a charging operation, an aging operation, a discharging operation, thus detecting defective batteries, and stabilizing a battery structure.

The prior art dealing with the method of casing the pouch-type rechargeable lithium battery is disclosed in Korean Laid-Open Publication No. 2005-594. According to the cited document, the pouch-type rechargeable lithium battery applies the same positive potential to a metal layer of the case and the anode terminal, thus destroying an inner layer of the case. Due to the destruction of the inner layer, a short-circuit is caused when the cathode terminal and the metal layer of the case contact each other, so that a difference in open circuit voltage is easily detected.

Meanwhile, when a high-power lithium battery is required, like in a hybrid car, several tens or hundreds of pouched batteries, shown in FIGS. 1 and 2, are layered and connected in series so as to provide high voltage.

Since the pouch-type lithium polymer battery comprises a fragile aluminum pouch which is easily bent or curved, the pouch must be protected by a strong case so as to be used for a lengthy period of time. According to the prior art, in order to connect the pouches in series, the anode and cathode terminals of each pouch are connected via a PCB (Printed Circuit Board) having a circuit pattern. The connected pouches are then put into the case.

However, the conventional method of providing the high-power lithium battery by layering the lithium polymer pouches is problematic in that it is difficult to perfectly protect the fragile lithium polymer pouches. Further, the method of layering several pouches and connecting the pouches to the PCB is incomplete, so that it is susceptible to environmental variation, such as external shocks.

Therefore, a method of more firmly and stably layering pouches constituting lithium batteries used as a high-power source, and reliably connecting the pouches in series is required.

DISCLOSURE OF INVENTION

Technical Problem

Accordingly, the present invention has been made keeping in mind the above problems occurring in the prior art, and an object of the present invention is to provide a structure which is capable of firmly and stably layering a plurality of lithium unit cells.

Another object of the present invention is to provide a layering structure which is capable of simultaneously layering and connecting a plurality of lithium unit cells, without an additional connecting device.

A further object of the present invention is to provide a layering structure which is capable of easily layering a plurality of lithium unit cells without an additional support device.

Technical Solution

In order to accomplish the object, the present invention provides a battery system, including first and second unit cells each having a pouch and anode and cathode terminals which are connected to a surface of the pouch and are oppositely bent in upward and downward directions. In this case, the cathode terminal of the second unit cell is directly connected to the anode terminal of the first unit cell.

ADVANTAGEOUS EFFECTS

As described above, the present invention provides a structure which is capable of firmly and stably layering a plurality of lithium unit cells.

Further, the present invention provides a layering structure which is capable of simultaneously layering and connecting a plurality of lithium unit cells, without an additional connecting device.

Furthermore, the present invention provides a layering structure which is capable of easily layering a plurality of lithium unit cells without an additional support device.

BRIEF DESCRIPTION OF THE DRAWINGS

FIG. 1 illustrates a conventional pouch-type rechargeable lithium battery;

FIG. 2 is an enlarged view of the conventional pouch-type rechargeable lithium battery taken along line I-I of FIG. 1;

FIG. 3 is a perspective view of a lithium unit cell, according to the present invention;

FIG. 4 illustrates the construction where two unit cells of FIG. 3 are layered;

FIG. 5 is a perspective view showing a main frame for holding the unit cell, according to the present invention;

FIG. 6 is a perspective view showing a cover frame for covering the unit cell, according to the present invention;

FIG. 7 is a view illustrating a structure of layering the unit cell, according to the present invention; and FIG. 8 is a perspective view showing a layering structure of a lithium battery system, according to the present invention.

BEST MODE FOR CARRYING OUT THE INVENTION

Hereinafter, the preferred embodiments of the present invention will be described in detail with reference to the accompanying drawings.

FIG. 3 is a perspective view of a lithium unit cell 31, according to the present invention.

According to this invention, the lithium unit cell 31 includes a pouch 34 and a pair of anode and cathode terminals 32 and 33. The pouch 34 has a rechargeable lithium battery structure therein. The anode and cathode terminals 32 and 33, each having the shape of a shelf, are provided on a surface of the pouch 34.

The pouch 34 may have a structure of the conventional pouch-type rechargeable lithium battery shown in FIG. 2, that is, a structure made by layering anode plates, cathode plates, and separators several times. Further, such a pouch is not rigid but is flexible, unlike typical metal or plastic.

The anode terminal 32 and the cathode terminal 33 are connected to the anode plate and the cathode plate (not shown), which are provided in the pouch 34. An end of the anode terminal 32 and an end of the cathode terminal 33 are bent in opposite directions with respect to the pouch 34.

Preferably, as shown in FIG. 3, connection parts 35 between the anode terminal 32 and the pouch 34 and between the cathode terminal 33 and the pouch 34 are stepped to be easily connected to electrode terminals of other unit cells.

Preferably, the anode terminal 32 may be made of aluminum, and the cathode terminal 33 may be made of nickel or copper.

FIG. 4 shows the state where two unit cells 31a and 31b of FIG. 3 are layered.

The first unit cell 31a and the second unit cell 31b of FIG. 4 have the same shape. Ends of the anode terminals of the first and second unit cells 31a and 31b are bent in opposite directions. Similarly, ends of the cathode terminals of the first and second unit cells 31a and 31b are bent in opposite directions.

When one unit cell is superposed on another unit cell having the same shape, the latter unit cell is turned upside down. That is, the unit cells are layered, as shown in FIG. 4. The anode terminals and the cathode terminals are alternately connected to each other, so that the two unit cells are connected in series.

That is, as shown in FIG. 4, an end of the anode terminal 32a of the first unit cell 31a is bent downwards, and an end of the cathode terminal 33a is bent upwards. Further, an end of the anode terminal 33b of the second unit cell 31b is bent downwards, and an end of the cathode terminal 32b is bent upwards.

The anode terminal 32a of the first unit cell 31a is connected to the cathode terminal 33b of the second unit cell 31b.

Through such a construction, the first unit cell 31a and the second unit cell 31b may be connected to each other in series only through a layering operation without an additional connecting unit, such as a PCB, unlike the prior art. The contact resistance becomes very low.

Additional unit cells may be layered on the layering structure of FIG. 4, as necessary. The additional unit cells are layered by alternately connecting the anode terminals and the cathode terminals such that they are connected in series.

FIG. 5 is a perspective view of a main frame 41 for packing the unit cell having the pouch and the electrode terminals of FIG. 3 or a battery unit having another pouch and electrode terminals, according to the present invention.

The main frame 41 includes a pouch support frame 47, a heat radiating part 46, and a terminal support 42. The pouch support frame 47 supports the pouch of the unit cell. The heat radiating part 46 is attached to a side surface of the pouch support frame 47, in the form of a shelf. The terminal support 42 is attached to a side wall of the heat radiating part 46 in the form of a wall, and supports the electrode terminals of the unit cell.

Preferably, the main frame 41 is manufactured using an integrated plastic product.

The pouch support frame 47 holds the pouch therein and serves to support the pouch by the outer surface of the pouch support frame 47. The heat radiating part 46 functions to disperse heat generated in the pouch.

As shown in FIG. 5, the pouch support frame 47 preferably has a predetermined depth to hold the pouch therein.

Preferably, a support grid 43 is provided in the pouch support frame 47, and serves to stably support the pouch held in the main frame 41.

The pouch support frame 47 may have frame locking parts 44a and 44b to be connected to another frame by inserting screws into the frame locking parts 44a and 44b.

The terminal support 42 serves to support anode and cathode terminals of the unit cell. Preferably, the terminal support may have terminal locking parts 45 so that the anode and cathode terminals are secured to the terminal locking parts 45 using screws.

Further, frame connection parts 48a and 48b are provided on opposite ends of the terminal support 42, and are connected to frame connection parts of another frame when the frames are connected to each other. Preferably, the main frame 41 may have another frame locking part 44c so as to be fastened to another frame.

FIG. 6 is a perspective view of a cover frame 51 which is layered on the main frame 41 of FIG. 5 and connected to the main frame 41 to cover the unit cell.

The cover frame 51 includes a pouch support frame 57, a heat radiating part 56, and a terminal support 52, like the main frame 41. The pouch support frame 57 supports the pouch of the unit cell. The heat radiating part 56 is attached to a side surface of the pouch support frame 57, in the form of a shelf. The terminal support 52 is attached to a side wall of the heat radiating part 56 in the form of a wall, and supports the electrode terminals of the unit cell.

Preferably, the cover frame 51 is manufactured using an integrated plastic product.

The main frame 41 and the cover frame 51 define a battery case. The cover frame 51 is layered on the main frame 41 to be connected to the main frame 41. Preferably, the cover frame 51 serves as a cover which covers the main frame 41. In this case, the frame connection parts 48a and 48b of the main frame 41 are connected to corresponding frame connection parts 58a and 58b of the cover frame 51.

That is, the unit cell is put into the main frame 41, and, thereafter, the cover frame 51 covers the main frame 41, thus stably casing the unit cell.

FIG. 7 is a view illustrating such a layering structure. The main frames 41 and the cover frames 51 are layered, and the unit cells of FIG. 3 are inserted into the main frame 41 and the cover frame 51. In this case, the unit cells are layered such that the anode terminals and the cathode terminals cross each other to be connected in series.

Such a layering structure allows the main frame 41 and the cover frame 51 to be stably connected to each other without an additional support or connecting device. The flexible unit cells may be inserted in the structure.

Further, screws or bolts are inserted into the frame locking parts 44a, 44b, 44c, 54a, 54b, and 54c provided on the pouch support frames 47 and 57 and the terminal supports 42 and 52, as necessary, thus increasing stability. Further, the electrode terminals may be secured to the terminal locking parts 45 and 55 provided on the terminal supports 42 and 52, using screws or bolts.

The main frame, the unit cell, and the cover frame constitute one unit. Other unit cells are inserted into the unit to be layered. Thereby, a plurality of unit cells, for example, 100 unit cells may be connected in series.

FIG. 8 is a perspective view showing the layering structure of a lithium battery system including a plurality of main frames and cover frames, and the unit cells inserted between the main frames and the cover frames.

INDUSTRIAL APPLICABILITY

As described above, the present invention is capable of firmly and stably layering a plurality of lithium unit cells.

Further, according to the present invention, it is capable of simultaneously layering and connecting a plurality of lithium unit cells, without an additional connecting device.

Furthermore, according to this invention, it is capable of easily layering a plurality of lithium unit cells without an additional support device.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery system, comprising:
   first and second unit cells each having a pouch and anode and cathode terminals which are connected to a surface of the pouch and are oppositely bent in upward and downward directions,
   a main frame having a first pouch support frame supporting the first unit cell,
   a first heat radiating part attached to one side of the first pouch support frame in the shape of shelf,
   a first terminal support attached to a side of the first heat radiating part in the shape of wall and supporting the anode and the cathode terminals of the first unit cell,
   a cover frame having a second pouch support frame laminated and fixed in the main frame and located between the first and the second unit cells, wherein one side supports the pouch of first unit cell and the other side supports the pouch of second unit cell, and
   a second heat radiating part attached to one side of the second pouch support frame, and a second terminal support attached to a side of the second heat radiating part in the shape of a wall and supporting the anode and the cathode terminals of the second unit cell, wherein the cathode terminal of the second unit cell is directly connected to the anode terminal of the first unit cell, and the anode terminal and the cathode terminal are formed on the same side of the pouch.

2. The battery system according to claim 1, wherein each of the anode and cathode terminals of the first and second unit cells is connected to a surface of the pouch in the form of a shelf.

3. The battery system according to claim 1, further comprising:

at least one unit cell having the same shape as the first and second unit cells, additionally layered on the first and second unit cells, and having anode and cathode terminals which are alternately and directly connected to the anode and cathode terminals of the first or second unit cell.

4. The battery system according to claim 1, wherein the first support frame of the main frame comprises a first support grid for supporting the pouch and a second frame locking part connected and fixed to the cover frame, and the second support frame of the cover frame comprises a second support grid for supporting the pouch and a second frame locking part connected and fixed to the second frame locking part of the main frame.

5. The battery system according to claim 1, wherein the first terminal support comprises a first terminal locking part for fixing the anode and cathode terminals of the first unit cell, and the second terminal support comprises a second terminal locking part for fixing the anode and cathode terminals of the first and second unit cells.

* * * * *